United States Patent [19]

Arakawa et al.

[11] Patent Number: 4,959,545
[45] Date of Patent: Sep. 25, 1990

[54] RADIATION IMAGE READ-OUT APPARATUS

[75] Inventors: Satoshi Arakawa; Kenji Takahashi, both of Kanagawa, Japan

[73] Assignee: Fuji Photo Film Co., Ltd., Kanagawa, Japan

[21] Appl. No.: 312,099

[22] Filed: Feb. 17, 1989

[30] Foreign Application Priority Data

Feb. 19, 1988 [JP] Japan .................................. 63-37002

[51] Int. Cl.⁵ .............................................. G01N 23/04
[52] U.S. Cl. .................................. 250/327.2; 250/207
[58] Field of Search .................. 250/207, 327.2, 484.1; 313/532

[56] References Cited

U.S. PATENT DOCUMENTS

| | | | |
|---|---|---|---|
| 2,172,324 | 9/1939 | Schert | 250/207 |
| 2,231,698 | 2/1941 | Zworykin et al. | 250/207 |
| 2,758,217 | 8/1956 | Scherbatskoy | 250/207 |
| 3,036,234 | 5/1962 | Dacey | 250/207 |
| 3,089,959 | 5/1963 | Chatten | 250/207 |
| 3,983,437 | 9/1976 | Benson et al. | 250/207 |
| 4,733,307 | 3/1988 | Watanabe | 250/578 |

Primary Examiner—Carolyn E. Fields
Attorney, Agent, or Firm—Sughrue, Mion, Zinn, Macpeak & Seas

[57] ABSTRACT

A radiation image read-out apparatus comprises a system for scanning a stimulable phosphor sheet, on which a radiation image has been stored, with stimulating rays in a main scanning direction, i.e. along a main scanning line, and a system for moving the stimulable phosphor sheet with respect to the stimulating rays in a direction approximately normal to the main scanning direction. An elongated photomultiplier having a light receiving face, which extends along the main scanning line on the stimulable phosphor sheet, is provided for detecting light emitted by the stimulable phosphor sheet during scanning. The elongated photomultiplier has a cylindrical main body, a photocathode provided on an inner surface of the main body, and a light guide member which extends along the light receiving face and guides the emitted light toward the photocathode. The light guide member is positioned so that a line, which passes through points at the centers of an inner edge face and an outer edge face of the light guide member, forms an acute angle at its intersection with the photocathode.

2 Claims, 2 Drawing Sheets

F I G . 1
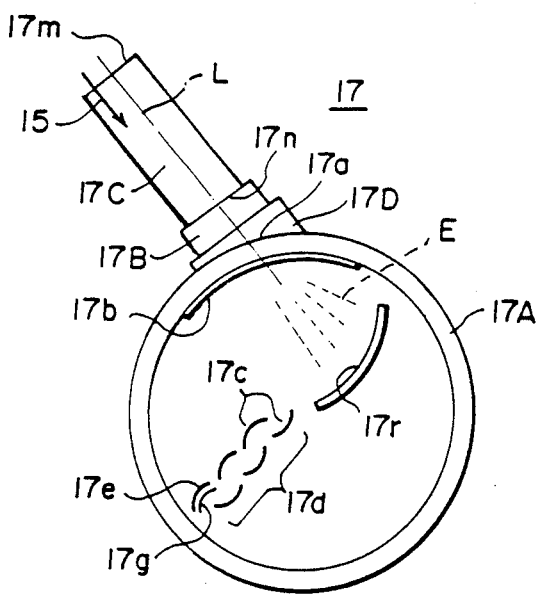
F I G . 2
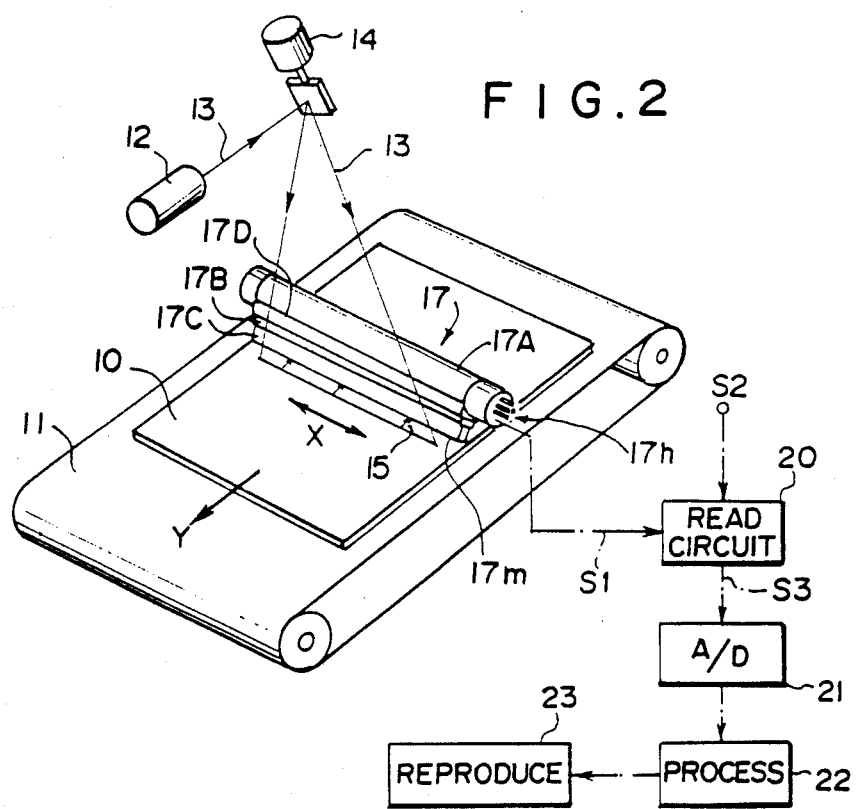

RADIATION IMAGE READ-OUT APPARATUS

BACKGROUND OF THE INVENTION

1. Field of the Invention

This invention relates to a radiation image read-out apparatus for reading out a radiation image stored on a stimulable phosphor sheet by exposing the stimulable phosphor sheet to stimulating rays which cause it to emit light in proportion to the amount of energy stored during exposure to the radiation, and photoelectrically detecting the emitted light. This invention particularly relates to a radiation image readout apparatus wherein a long or elongated photomultiplier is utilized as a means for detecting the light emitted by the stimulable phosphor sheet.

2. Description of the Prior Art

When certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored during exposure to the radiation. A phosphor exhibiting such properties is referred to as a stimulable phosphor.

As disclosed in U.S. Patent Nos. 4,258,264, 4,276,473, 4,315,318 and 4,387,428 and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then exposed to stimulating rays, such as a laser beam, which cause it to emit light in proportion to the amount of energy stored during exposure to the radiation. The light emitted by the stimulable phosphor sheet upon stimulation thereof is photoelectrically detected and converted to an electric image signal, which is processed as desired to reproduce a visible image having an improved image quality, which allows the visible image to be used in making efficient and accurate diagnoses of illnesses.

In general, radiation image read-out apparatuses used in the aforesaid radiation image recording and reproducing systems are constituted by a main scanning means for scanning a stimulable phosphor sheet, on which a radiation image has been stored, with stimulating rays in a main scanning direction, i.e., along a main scanning line, a sub scanning means for moving the stimulable phosphor sheet with respect to the stimulating rays in a sub scanning direction approximately normal to the main scanning direction, and a photo detecting means for detecting light emitted by the stimulable phosphor sheet in proportion to the amount of energy stored during exposure to radiation.

Recently, a novel photo detecting means which utilizes a long photomultiplier was proposed in, for example, Japanese Unexamined Patent Publication No. 62(1987)-16666. The disclosed long photomultiplier is provided with a cylindrical main body having a light receiving face which extends along the main scanning line on the stimulable phosphor sheet. A photocathode is provided on an inner surface of the main body along the light receiving face. Also, in general, a light guide member is located so that it is in close contact with the light receiving face and so that it extends along the light receiving face and guides the light emitted by the stimulable phosphor sheet toward the photocathode. With the long photomultiplier, non-directional light emitted by the stimulable phosphor sheet is guided by the light guide member toward the photocathode. When exposed to light emitted by the stimulable phosphor sheet, the photocathode generates photoelectrons, which are sequentially multiplied by the secondary electron emission effects of dynodes.

With the aforesaid long photomultiplier, light emitted by every portion of the stimulable phosphor sheet in the main scanning direction can be detected efficiently. Also, radiation image read-out apparatuses using the long photomultiplier can be made smaller than apparatuses using a photomultiplier in which a light guide member having a complicated shape is located so that it is in close contact with a small light receiving face, as disclosed in, for example, Japanese Unexamined Patent Publication No. 54(1979)-87808.

However, the aforesaid long photomultiplier has a drawback in that a large number of photoelectrons cannot readily be emanated from the photocathode. Specifically, in order to generate a large number of photoelectrons in the photocathode, it is necessary to increase the light absorption efficiency of the photocathode. For this purpose, the photocathode should be made thicker. However, photoelectrons generated at positions deep within the width of the photocathode cannot readily be emanated out of the photocathode. From this viewpoint, the photocathode should be made thinner. These two incompatible requirements make it difficult for a large number of photoelectrons to emanate from the photocathode.

SUMMARY OF THE INVENTION

The primary object of the present invention is to provide a radiation image read-out apparatus utilizing a long or elongated photomultiplier wherein a large number of photoelectrons are emanated from a photocathode.

Another object of the present invention is to provide a radiation image read-out apparatus wherein read-out signals representing a radiation image are obtained and have a high signal-to-noise ratio.

The present invention provides a radiation image read-out apparatus comprising:

(i) a main scanning means for scanning a stimulable phosphor sheet, on which a radiation image has been stored, with stimulating rays in a main scanning direction, or along a main scanning line, thereby causing the stimulable phosphor sheet to emit light in proportion to the amount of energy stored during exposure to radiation, (ii) a sub-scanning means for moving the stimulable phosphor sheet with respect to the stimulating rays in a sub-scanning direction approximately normal to the main scanning direction, and (iii) a photo detecting means provided with a an elongated photomultiplier having a light receiving face, which extends along the main scanning line on the stimulable phosphor sheet, for detecting the light emitted by the stimulable phosphor sheet, wherein the improvement comprises:

(a) said elongated photomultiplier being provided with a cylindrical main body, a photocathode being provided on an inner surface of said main body, and a light guide member being provided on said light receiving face so as to extend along said light receiving face, said light guide member guiding said light emitted by said stimulable phosphor sheet toward said main body and radiating said light toward said photocathode, and (b) said light guide member being positioned so that a line, passing through a point at the center of an inner edge face (light output face) of said light guide member and a point at the center of an outer edge face (light input face) of said light guide member, forms an acute angle at its intersection with said photocathode.

Light emitted by a stimulable phosphor sheet is nondirectional, and therefore the light radiated out of the inner edge face of the light guide member impinges on the photocathode at various angles. However, when the light guide member is positioned as defined above, the probability that the light will impinge on the photocathode with a large angle of incidence increases. As a result, even if the photocathode is thin, the distance over which the light travels in the photocathode becomes longer, and therefore the efficiency of light absorption in the photocathode increases. On the other hand, when the photocathode is thin, photoelectrons generated in the photocathode can easily emanate from the photocathode.

With the radiation image read-out apparatus in accordance with the present invention wherein the light guide member of the elongated photomultiplier is positioned so that the light guide member faces the photocathode obliquely, a larger number of photoelectrons can emanate from the photocathode. Therefore, a read-out signal having a high signal to-noise ratio can be obtained, which read-out signal represents a radiation image, which was stored on a stimulable phosphor sheet. A visible radiation image having a high image quality can then be reproduced.

BRIEF DESCRIPTION OF THE DRAWINGS

FIG. 1 is a sectional side view showing an example of the elongated photomultiplier utilized in accordance with the present invention, FIG. 2 is a perspective view showing an embodiment of the radiation image read-out apparatus in accordance with the present invention wherein the elongated photomultiplier shown in FIG. 1 is employed.

DESCRIPTION OF THE PREFERRED EMBODIMENTS

Figure 3:
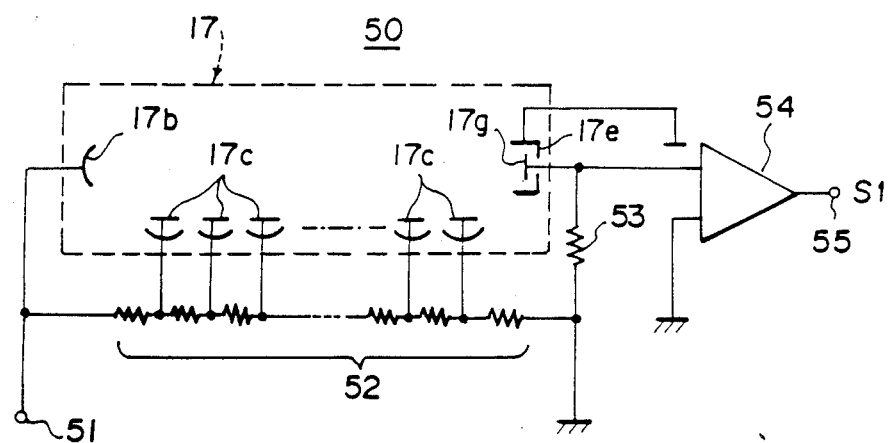
FIG. 3 is a circuit diagram showing an electric circuit for the elongated photomultiplier shown in FIG. 1.

The present invention will hereinbelow be described in further detail with reference to the accompanying drawings.

With reference to FIG. 2, a stimulable phosphor sheet 10 carrying a radiation image of an object stored thereon, by way of example, by being exposed to radiation which has passed through the object, is moved by a sheet movement means 11 constituted by an endless belt or the like in a sub-scanning direction indicated by the arrow Y. At the same time, a laser beam 13 produced by a laser beam source 12 is deflected by a light deflector 14, which may be a galvanometer mirror or the like, and scans the stimulable phosphor sheet 10 in a main scanning direction indicated by the arrow X, which is approximately normal to the sub-scanning direction indicated by the arrow Y. When the stimulable phosphor sheet 10 is thus exposed to the laser beam 13, the exposed portion of the stimulable phosphor sheet 10 emits light 15 with an intensity proportional to the amount of energy stored during exposure to radiation. The emitted light 15 is detected by a elongated photomultiplier 17 as will be described later. An output S1 of the long photomultiplier 17 which represents the intensity of the emitted light 15 is fed to a read-out circuit 20 which processes it in various ways, such as amplifying it or carrying out a logarithmic conversion on it. Also, the output S1 is integrated over a predetermined period, which period is clocked by a synchronizing signal S2 which is based on the timing of the scanning of the laser beam 13, so that an analog read-out image signal S3, which is divided into sequential picture elements is obtained from the read-out circuit 20. By way of example, the read-out image signal S3 is digitized by an A/D converter 21, and fed to an image processing circuit 22, which carries out signal processing (image processing), such as gradation processing or frequency response processing, thereon. Then, the read out image signal S3 is fed to an image reproducing apparatus 23 constituted by a CRT, a printer or the like, and is used to reproduce the radiation image, which was stored on the stimulable phosphor sheet 10, as a visible image.

The long photomultiplier 17 will hereinbelow be described in detail with reference to FIG. 1. In FIG. 1, similar elements are numbered with the same reference numerals with respect to FIG. 2. The long photomultiplier 17 has a cylindrical main body 17A which is constituted of glass and which has been evacuated. A photocathode 17b is provided on an inner surface of the main body 17A so that the photocathode 17b faces an elongated light receiving face 17a which extends in the longitudinal direction of the main body 17A. A reflection plate 17r is provided inwardly from the photocathode 17b. Also, a multiplying section 17d composed of a plurality of dynodes 17c, 17c, . . . having secondary electron emission effects is provided inside of the main body 17A. A shield electrode 17e is positioned facing the dynode 17c at the left end of the multiplying section 17d, and an anode 17g for collecting the electron streams, which were multiplied by the multiplying section 17d, and generating a signal therefrom is positioned inwardly from the shield electrode 17e. These electrodes are electrically connected in a one-to-one relation to the terminals in a terminal group 17h provided at a side extremity of the main body 17A. The reflection plate 17r, the dynodes 17c, 17c, . . . , the shield electrode 17e and the anode 17g have lengths approximately equal to the length of the photocathode 17b.

A transparent adapter 17D and a filter 17B are provided on the light receiving face 17a of the main body 17A. By way of example, the filter 17B substantially transmits the emitted light 15 and filters out light from the laser beam 13, which is reflected by the stimulable phosphor sheet 10. A light guide member 17C constituted of glass or the like is located so that it is in close contact with the filter 17B. The filter 17B and the light guide member 17C have lengths approximately equal to the length of the photocathode 17b. The long photomultiplier 17 is provided so that an elongated outer edge face 17m of the light guide member 17C extends along and close to the line along which the laser beam scans (main scanning line) the stimulable phosphor sheet 10. Also, the light guide member 17C is provided so that an imaginary line L, which passes through a point at the center of the outer edge face (light input face) 17m and a point at the center of an inner edge face (light output face) 17n, forms an acute angle at its intersection with the photocathode 17b.

FIG. 3 shows an electric circuit 50 for operating the long photomultiplier 17 and obtaining a photoelectric output therefrom. In FIG. 3, similar elements are numbered with the same reference numerals with respect to FIG. 1. A high negative voltage is applied to the photocathode 17b at a high negative voltage applying terminal 51. The high negative voltage applied to the high negative voltage applying terminal 51 is divided by a bleeder resistance group 52 into voltages which are applied respectively to the dynodes 17c, 17c, . . . The shield electrode 17e is grounded. The anode 17g is connected to the bleeder resistance group 52 via a resistor 53, and is connected to one of terminals of an amplifier 54.

The light 15 emitted by the stimulable phosphor sheet 10 enters the light guide member 17C through its outer edge face 17m, is guided inside of the light guide member 17C, and radiated out of the inner edge face 17n. The light 15 then passes through the filter 17B and the light receiving face 17a, impinges upon the photocathode 17b and causes it to emanate photoelectrons E. The photoelectrons E advance directly toward the dynodes 17c, 17c, . . . in accordance with the electric field. When the photoelectrons E flow toward the anode 17g, they impinge upon the dynodes 17c, 17c, . . . , and cause the dynodes 17c, 17c, . . . to emanate secondary electrons. In this manner, the photoelectrons are multiplied sequentially by the dynodes 17c, 17c, . . . A current is obtained in this manner and is fed to the amplifier 54. Therefore, an analog electric signal S1 representing the intensity of the light 15, i.e., the image which was stored on the stimulable phosphor sheet 10, is delivered to an output terminal 55 of the amplifier 54.

In the long photomultiplier 17, the light guide member 17C is inclined with respect to the photocathode 17b as described above. Therefore, a larger number of photoelectrons E can be emanated from the photocathode 17b than from a conventional long photomultiplier. This effect will hereinbelow be described in detail. The light 15 emitted by the stimulable phosphor sheet 10 is non-directional, and therefore the light 15 is radiated at various angles from the light output face 17n of the light guide member 17C. However, when the light guide member 17C is inclined with respect to the photocathode 17b, the probability that the light 15 will impinge obliquely upon the photocathode 17b is higher than in a conventional long photomultiplier wherein the light guide member 17C stands upright so that said imaginary line L, described hereinbefore, is parallel to a radius of the main body 17A. When the light 15 impinges obliquely upon the photocathode 17b, the light 15 travels over a larger distance when passing therethrough. As a result, the amount of light 15 absorbed in the photocathode 17b increases, and a larger number of photoelectrons E are generated. Also, with the long photomultiplier 17, the amount of the light 15 absorbed in the photocathode 17b increases in the manner described above. Therefore, the photocathode 17b need not be made particularly thick in order to increase the amount of light 15 absorbed in the photocathode 17b. When the photocathode 17b is comparatively thin, the photoelectrons E are generated in the vicinity of the surface of the photocathode 17b, and can easily be emanated from the photocathode 17b.

The present invention is not limited to the use of long photomultipliers having the electrode configuration described above, and is applicable also when long photomultipliers having different electrode configurations, for example, a venetian blind type electrode configuration disclosed in Japanese Unexamined Patent Publication No. 62(1987)-16666, are utilized.

We claim:
1. A radiation image read-out apparatus comprising:
   (i) a main scanning means for scanning a stimulable phosphor sheet, on which a radiation image has been stored, with stimulating rays in a main scanning direction, or along a main scanning line, thereby causing the stimulable phosphor sheet to emit light in proportion to the amount of energy stored during exposure to radiation,
   (ii) a sub-scanning means for moving the stimulable phosphor sheet with respect to the stimulating rays in a sub-scanning direction approximately normal to the main scanning direction, and
   (iii) a photo detecting means provided with an elongated photomultiplier having a light receiving face, which extends along the main scanning line on the stimulable phosphor sheet, for detecting the light emitted by the stimulable phosphor sheet, wherein the improvement comprises:
      (a) said elongated photomultiplier being provided with a cylindrical main body, a photocathode being provided on an inner surface of said main body, and a light guide member being provided on said light receiving face so as to extend along said light receiving face and projection outward therefrom, said light guide member guiding said light emitted by said stimulable phosphor sheet toward said main body and radiating said light toward said photocathode, and
      (b) said light guide member being inclined with respect to said cylindrical main body and said photocathode so that a line, passing through a point at the center of an inner edge face of said light guide member and a point at the center of an outer edge face (light input face) of said light guide member, forms an acute angle at its intersection with said photocathode.
2. An apparatus as defined in claim 1 wherein said stimulating rays are a laser beam.

* * * * *